(12) United States Patent
Okumura et al.

(10) Patent No.: US 7,695,575 B2
(45) Date of Patent: Apr. 13, 2010

(54) PIN FOR CHAIN AND METHOD FOR MANUFACTURE THEREOF

(75) Inventors: Yoshio Okumura, Kaga (JP); Akira Fujiwara, Wako (JP)

(73) Assignees: Daido Kogyo Co., Ltd., Ishikawa (JP); Honda Motor Co., Ltd., Tokyo (JP)

( * ) Notice: Subject to any disclaimer, the term of this patent is extended or adjusted under 35 U.S.C. 154(b) by 572 days.

(21) Appl. No.: 10/559,287

(22) PCT Filed: Jun. 1, 2004

(86) PCT No.: PCT/JP2004/007511

§ 371 (c)(1),
(2), (4) Date: Mar. 24, 2006

(87) PCT Pub. No.: WO2004/109153

PCT Pub. Date: Dec. 16, 2004

(65) Prior Publication Data

US 2006/0162819 A1      Jul. 27, 2006

(30) Foreign Application Priority Data

Jun. 3, 2003   (JP) .............................. 2003-158075

(51) Int. Cl.
*C23C 8/22*   (2006.01)

(52) U.S. Cl. ................. 148/319; 148/227; 428/698
(58) Field of Classification Search ................. 428/698; 148/319, 227
See application file for complete search history.

(56) References Cited

U.S. PATENT DOCUMENTS

2002/0031687 A1   3/2002   Wang et al.
2002/0119852 A1   8/2002   Tada et al.

FOREIGN PATENT DOCUMENTS

JP   2002-195356   7/2002
WO   02/02843      1/2002

*Primary Examiner*—Roy King
*Assistant Examiner*—Weiping Zhu
(74) *Attorney, Agent, or Firm*—Wenderoth, Lind & Ponack L.L.P.

(57) ABSTRACT

A chain pin manufacturing method that requires only one heat treatment step of forming a boundary part composed of $(V, Cr)_8C_7$ by Cr and C in a base material at first through a cementation process in a VCl atmosphere by using Cr-rich steel as the pin base material and of forming a surface layer composed of $V_8C_7$. A Cr content in the boundary part decreases gradually toward the base material and the surface layer and the boundary part is not clearly divided. The inventive manufacturing method is simple and enables to manufacture the pin having high abrasion resistance and suitably used in a severe environment like a timing chain.

3 Claims, 6 Drawing Sheets

STRUCTURE OF COATING FILM

STRUCTURE OF COATING FILM (SEEN BY PHOTOGRAPH)

STRUCTURE OF COATING FILM (FROM ANALYSIS)

SCHEMATIC SECTION VIEW

V

Cr

US 7,695,575 B2

PIN FOR CHAIN AND METHOD FOR MANUFACTURE THEREOF

TECHNICAL FIELD OF THE INVENTION

The present invention relates to a pin for use in a power transmission chain such as a silent chain and a roller chain and more specifically to a chain pin suitably used especially for a chain used in an engine and to a manufacturing method thereof.

BACKGROUND ART OF THE INVENTION

Generally, a relative revolutionary sliding movement occurs between a pin and a link plate in case of a silent chain and between a pin and a bush in case of a roller chain, thus causing abrasion of the pin. Then, various surface treatments have been implemented on the surface of the pin in order to reduce such abrasion.

Conventionally, as a pin whose surface is treated, there have been known a pin in which a chrome carbide layer is formed on the surface thereof (referred to as a chromizing pin hereinafter) and a pin in which a vanadium carbide layer is formed on the surface thereof (referred to as a VC pin hereinafter). Because there are cases when the chromizing pin causes peeling at the surface of the chrome carbide layer and when the VC pin causes peeling at the boundary surface between the vanadium carbide layer and a base material (raw material of the pin) under a use environment in which high surface pressure is repeatedly applied, it is considered that resistance of chrome carbide to surface pressure is low even though its adhesion (binding quality) with the base material is good and that resistance of vanadium carbide to surface pressure is high even though its adhesion with the base material is low.

Based on the result of the above consideration, Japanese Patent Laid-open No. 2002-195356 has proposed a method of forming a chrome carbide layer on the surface of a pin base material made from steel by carrying out a chrome cementation process and of forming, thereon, a mixed layer which is thicker than the above-mentioned chrome carbide layer and which contains vanadium carbide as its main component and a small amount of chrome carbide by carrying out a vanadium cementation process at temperature higher than that of the chrome cementation process for the purpose of improving the abrasion resistance under high surface pressure.

However, the pin proposed as described above has had a problem that because the chrome and vanadium cementation process has to be carried out after carrying out the chrome cementation process at the temperature higher than that of the chrome cementation process, it has been cumbersome and costly to carry out such surface treatments.

Especially, in case of a timing chain or the like to which high surface pressure is applied under a high temperature environment within an engine, the surface pressure resistance of the outermost surface of the pin is not enough as compared to one composed of vanadium carbide (Vx Cy, $V_8C_7$ for example) because it is formed of the mixed layer of vanadium carbide and chrome carbide [(V, Cr)xCy, (V, Cr) $_8C_7$ for example]. Thus it may cause peeling on the surface and abrasion thereof may advance with the advance of peeling. Still more, because a clear intermediate layer composed of the chrome carbide layer exists between the chrome and vanadium mixed layer and the steel, i.e., the base material, there is a possibility of causing peeling at the boundary surfaces between the intermediate layer and the mixed layer, i.e., the upper layer thereof, and between the intermediate layer and the steel base material, i.e., the lower layer thereof, causing quick abrasion as a result.

SUMMARY OF INVENTION

Accordingly, it is an object of the invention to provide a chain pin and a manufacturing method thereof that solve the above-mentioned problems by forming compound carbide in which chrome content changes in gradient and no clear interface is formed between a base material of the pin and a surface layer composed of vanadium carbide. According to a first aspect of the invention (see FIGS. 4a, 4b and 4c for example), an inventive chain pin is characterized in that compound carbide of vanadium and chrome [(V, Cr)xCy, (V,Cr) $_8C_7$ for example] exists in a boundary part (5) between a pin base material (1) and a surface layer (6) composed of vanadium carbide (Vx, Cy, $V_8C_7$ for example) and that the content of chrome (Cr) in the compound carbide decreases gradually toward the surface layer and becomes zero [%] at the surface layer.

According to a second aspect of the invention (see FIG. 3 for example), an inventive manufacturing method of a chain pin is characterized in that steel containing chrome by 0.6 [%] or more is used as a pin base material (1) and a cementation process is carried out on the pin base material (1) at predetermined temperature within a gaseous atmosphere containing vanadium (VCl for example) to form, at first, compound carbide of vanadium and chrome ((V,Cr)$_8C_7$ for example) on the surface of the pin base material (1) by chrome (Cr) and carbon (C) supplied from the pin base material (1) and vanadium (V) within the atmosphere, and then to form a surface layer composed of vanadium carbide ($V_8C_7$ for example) by vanadium (V) within the atmosphere without forming an interface (8) between the surface layer (6) and the compound carbide in a condition in which the supply of chrome (Cr) from the pin base material (1) decreases.

Preferably, the cementation process in the manufacturing method of the chain pin in the second aspect of the invention (see FIG. 3 for example) includes a powder pack method using powder containing vanadium [ferro-vanadium (FeV) for example], a sintering stopping agent [alumina ($Al_2O_3$) for example] and an accelerator [halide such as ammonium chloride ($NH_4Cl$)] and the temperature of the heat treatment is set at 1,000 [° C.] to 1,100 [° C.].

While the reference characters have been appended above in the parentheses for the purpose of making a reference to the drawings, it is noted that they will by no means affect the composition of the appended claims.

According to the first aspect of the invention, the surface layer (6) is composed of the vanadium carbide and has high face pressure resistance, so that it is possible to prevent peeling from occurring on the surface even in a severe use condition in which high face pressure is repeatedly applied at high temperature. Further, the compound carbide of vanadium and chrome is formed at the boundary part between the surface layer (6) and the pin base material (1) without forming distinct interfaces, so that it is possible to enhance the adhesion strength of the surface layer (6) with the pin base material (1) and to prevent peeling from occurring at the interfaces of the compound carbide, the pin base material (1) and the surface layer (6). Thus, it becomes possible to reduce the abrasion of the pin and to prolong the durability and life of the chain even when it is used under a severe use environment.

According to the second aspect of the invention, the compound carbide of vanadium and chrome is formed at first on the surface of the pin base material (1) and then the surface layer (6) composed of vanadium carbide is formed without forming an interface with the layer of compound carbide through the cementation process based on one step of heat treatment without using two or more penetrants by using the chrome-rich steel as the pin base material, so that the high precision chain pin may be manufactured by one step of heat treatment readily and steadily at low cost.

Still more, according to the second aspect of the invention, the chain pin may be manufactured accurately without increasing the cost so much by carrying out one step of heat treatment at the temperature of 1,000 [° C.] to 1,100 [° C.] by the powder pack method having actual results.

BRIEF DESCRIPTION OF DRAWINGS

FIGS. 4a, 4b and 4c are schematic pictorial views showing sections of the inventive chain pin, wherein FIG. 4a is a schematic pictorial view showing the structure of a coating film obtained from a sectional photograph, FIG. 4b is a schematic pictorial view showing the structure of the coating film analyzed from the analytical result and FIG. 4c is a schematic pictorial view of the section of the coating film.

FIGS. 5a and 5b are graphs showing the analytical results of the inventive chain pin analyzed by an X-ray probe analyzer, wherein FIG. 5a shows a vanadium content and FIG. 5b shows a chrome content.

DETAILED DESCRIPTION OF THE INVENTION

Figure 1:
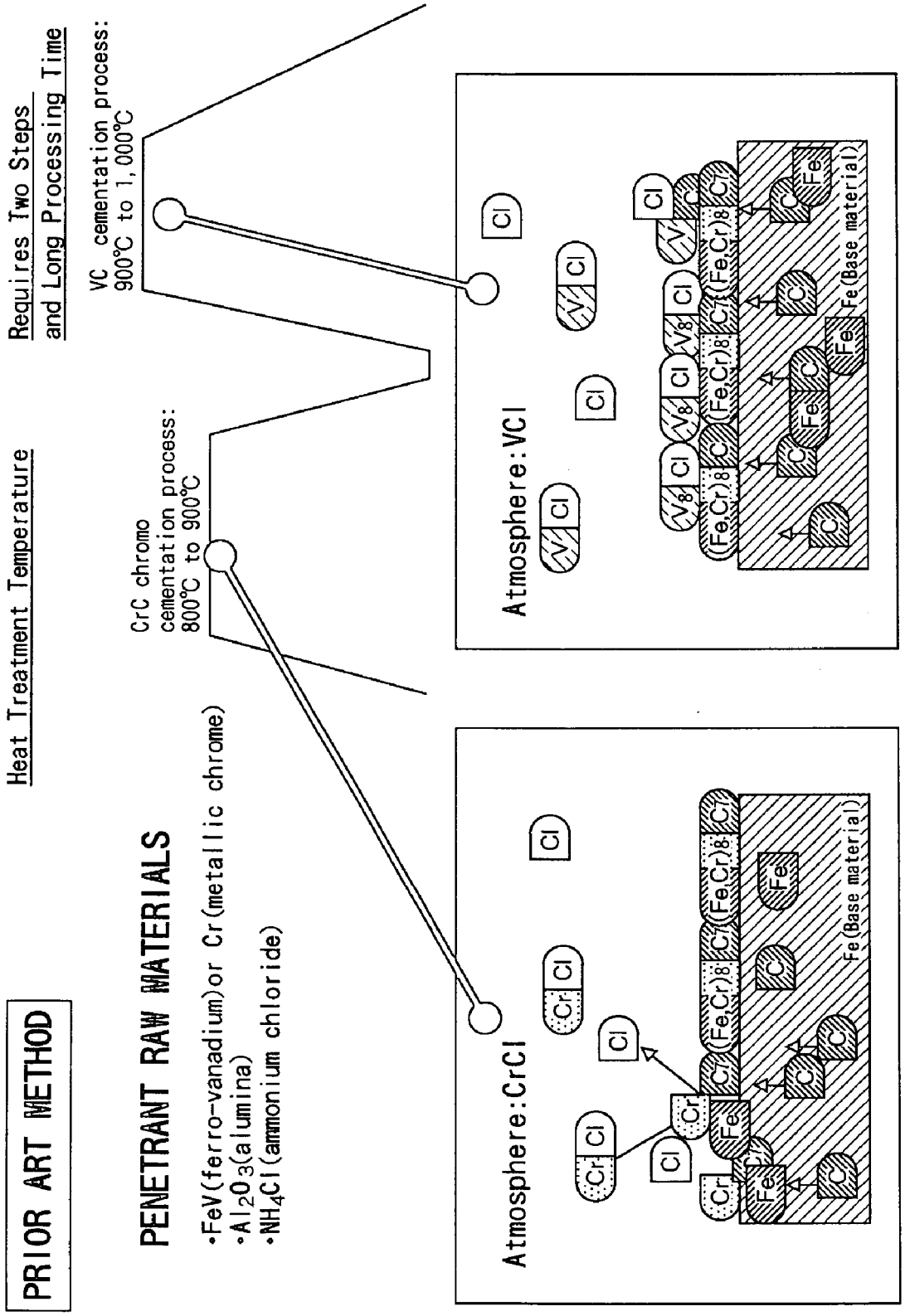
FIG. 1 is a chart showing a conventional manufacturing method of a chain pin (as proposed in Japanese Patent Laid-open No. 2002-195356).

A mode for carrying out the invention will be explained below with reference to the drawings. An inventive chain pin is applicable to all kinds of power transmission chains such as publicly known roller and silent chains and is suitably applicable to a chain used within an engine such as a timing chain in particular.

A roller chain is constructed by endlessly connecting pin links in which both ends of two pin link plates are connected by pins with roller links in which both ends of two roller link plates are connected similarly by bushes by fitting the pins into the bushes and by loosely fitting rollers around the bushes. A silent chain is constructed by endlessly connecting a train of guides composed of a plurality of link plates having guide link plates at the both ends with a train of knuckles having no guide link plate and having only toothed link plates by pins fixed in the guide link plates.

Then, every time when such chain is wound, a sliding contact movement occurs between the pin and the bush in case of the roller chain and between the pin and a pinhole of the link plates of the train of knuckles in case of the silent chain. Further, because a large tensile force acts on the chain, a large surface pressure acts on the pins having the sliding contact movement.

While the invention relates to the chain pin, the aforementioned conventional pin and the manufacturing method thereof will be explained at first with reference to FIG. 1 before explaining the mode for carrying out the invention.

A base material 1 of the pin is made from steel such as high carbon steel for mechanical structures of S50C (C:0.47 to 0.53%, Si:0.15 to 0.35%, Mn:0.60 to 0.90%, P:0.30% or less, S:0.35% or less, Cr as impurity: 0.20% or less) for example and two steps of metal cementation processes are carried out on the pin base material (raw material) 1 of steel (Fe). The metal cementation process of the first step is a chrome cementation process (CrC cementation process, chromizing) in which powder containing Cr (metallic chrome) as penetrant raw material, $Al_2O_3$ (alumina) as sintering stopping agent and $NH_4Cl$ (ammonium chloride) as accelerator is put into a furnace together with the pin base material and temperature is raised to 800° C. to 900° C., which is held for a predetermined time. In the CrC cementation process in the furnace, the following chemical reactions take place: $NH_4Cl \rightarrow NH_3 + HCl$ (gas), and HCl (gas)+Cr (metallic powder)$\rightarrow$CrCl (gas)+ $H_2\uparrow$. Then, in the CrCl atmosphere, Fe and C within the pin base material combine with Cr in the atmosphere, thus forming (Fe, Cr)xCy, e.g., $(Fe, Cr)_8C_7$, and a coating layer on the surface of the pin base material 1 at first as chrome carbide (CrC) penetrates therein.

After finishing the chrome cementation process of the pin base material, the pin whose surface is cemented and coated by the chrome carbide (chromizing pin) is taken out of the furnace once to carry out a vanadium cementation process (VC cementation process) as a metal cementation process of the second step. In the vanadium chrome cementation process, FeV (ferro-vanadium) is used as penetrant raw material. Beside that, alumina and ammonium chloride are put into the furnace together with the chromizing pin and the temperature is raised to 900° C. to 1,000° C., which is held for a predetermined time similarly to the chrome cementation process described above. In the VC cementation process in the VCl atmosphere, C in the pin base material combines with V in the atmosphere, thus forming VxCy, e.g. $V_8C_7$, and a surface coating layer is formed on the layer of the chrome carbide on the surface of the pin base material as vanadium carbide penetrates therein. While the surface coating layer contains the vanadium carbide as its main component, it contains a small amount of the chrome carbide, thus forming a mixed layer.

Figure 2:
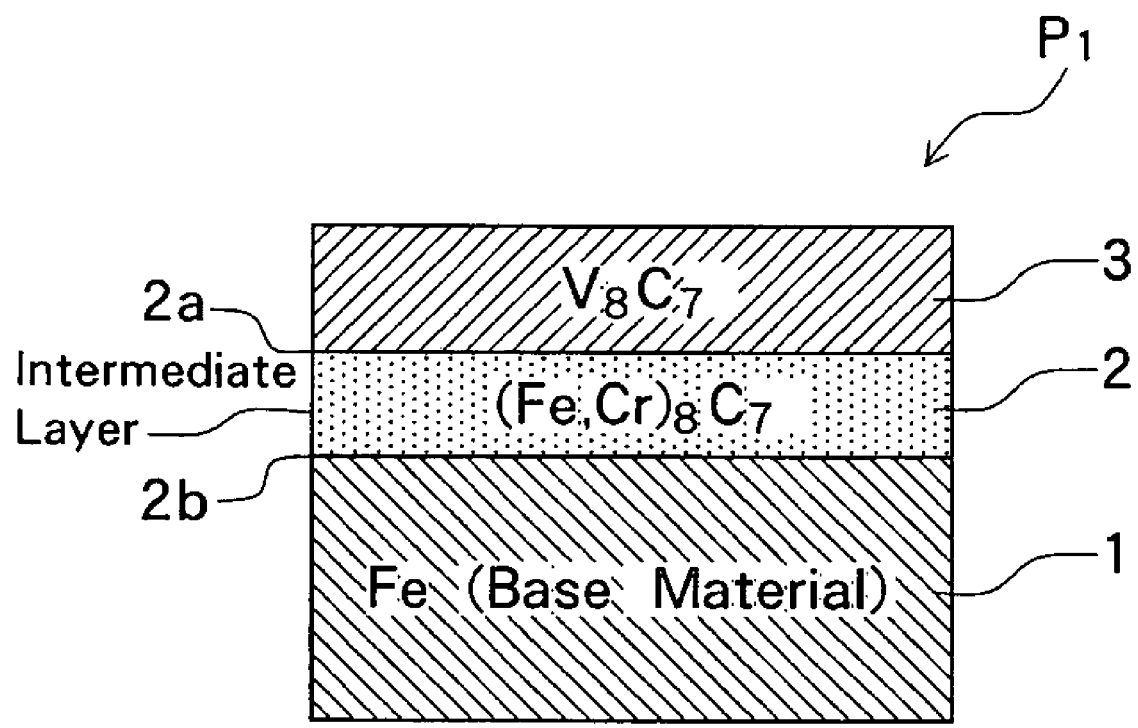
FIG. 2 is a schematic diagram showing the structure of a coating film of the conventional chain pin obtained from a sectional photograph.

Accordingly, in the conventional chain pin $P_1$, an intermediate layer 2 composed of the chrome carbide $(Fe, Cr)_8C_7$ is formed at first on the pin base material 1 mainly composed of Fe, and then a surface layer 3 mainly composed of vanadium carbide $(V_8C_7)$ is formed thereon as shown in FIG. 2. The intermediate layer 2 composed of the chrome carbide is clearly distinguishable from the pin base material 1 and the surface layer 3 mainly composed of vanadium carbide in a sectional photograph.

Figure 3:
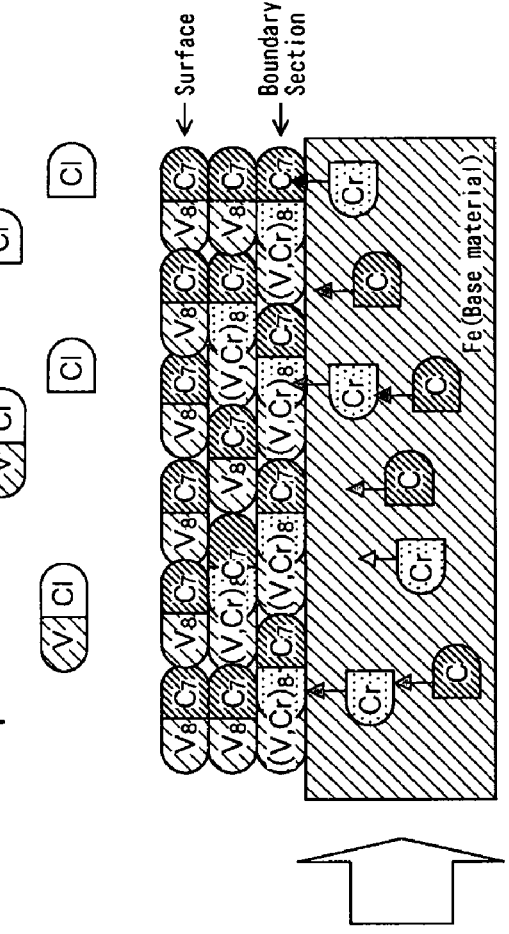
FIG. 3 is a chart showing an inventive manufacturing method of a chain pin.
Figure 3:
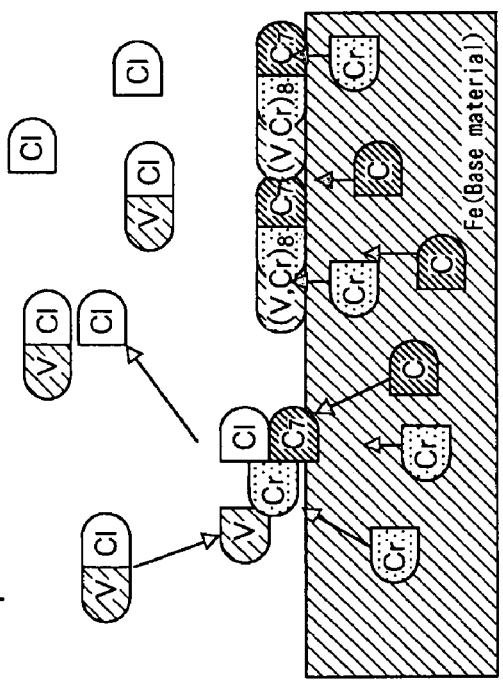

FIG. 3 shows an inventive manufacturing method of a chain pin. This manufacturing method is carried out by one step of metal cementation process, i.e., only a powder pack method of vanadium cementation process (VC compound cementation process). In the VC compound cementation process, powder containing FeV (ferro-vanadium) as penetrant (powder), $Al_2O_3$ which is powder of refractory material as a sintering stopping agent and $NH_4Cl$, i.e., halide, such as ammonium chloride as additive (accelerator) is put into the furnace together with the pin base material 1. For the base material 1, steel members having a high chrome content (Cr: 0.6 wt % or more) such as chromium-molybdenum steel (SCM), chromium steel (SCr), nickel-chromium-molybdenum steel (SNCM), nickel-chromium steel (SNC), manganese-chromium steel (SMnC), high carbon chromium bearing steel (SUJ), nitriding steel (SACM, SCM, SCMV) and soft nitriding steel (SAC), e.g., SNCM439 (C:0.36 to 0.43%, Si:0.15 to 0.35%, Mn:0.60 to 0.90%, P:0.030% or less, S:0.03% or less, Cr:0.6 to 1.00%, Ni:1.6 to 2.00%, Mo:0.15 to 0.30%) or SUJ2 (C:0.95 to 1.10%, Si:0.15 to 0.30%, Mn:0.50% or less, P:0.025% or less, S:0.025% or less, Cr:1.30 to 1.60%) may be used. It is noted that SACM645, SCM56, SCMV2, SAC51 and SAC72 are preferable as the pin base material because they contain Cr by 1.00 [wt %] or more.

The temperature of the penetrant raw material and the pin base material is raised to 1,000° C. to 1,100° C. in the furnace and is quenched after holding that temperature for a predetermined time. Thereby, in the VCl atmosphere in which HCl (gas) decomposed from $NH_4Cl$ combines with V in FeV, V in the atmosphere combines with Cr and C diffused from the pin base material (raw material) at first, thus forming compound carbide of vanadium and chrome [(V, Cr)xCy, e.g., (V, Cr) $_8C_7$]. Then, a boundary part composed of the vanadium and chrome compound carbide is formed on the surface of the pin base material. As the cementation process advances, the supply of Cr from the pin base material decreases (the supplying effect is reduced) and V in the atmosphere combines with C from the base material, thus forming vanadium carbide (VxCy, e.g., $V_8C_7$) that coats the surface of the pin.

Figure 4A:
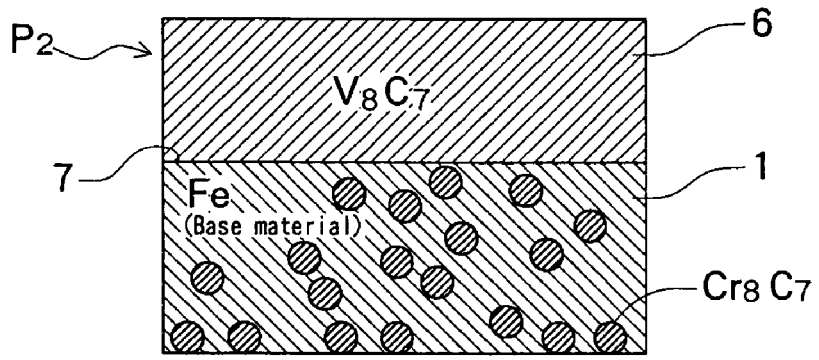
Figure 4B:
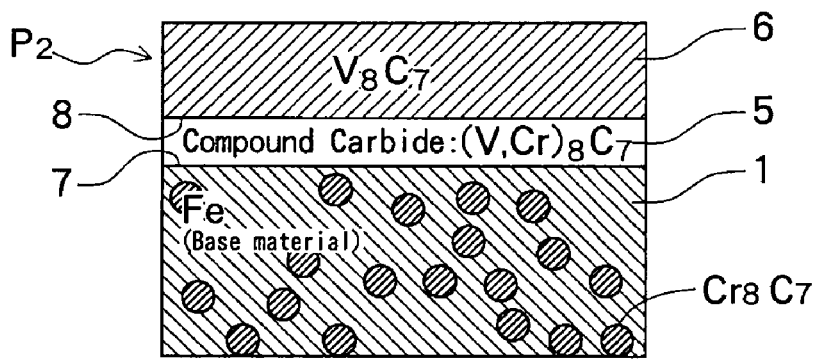
Figure 4C:
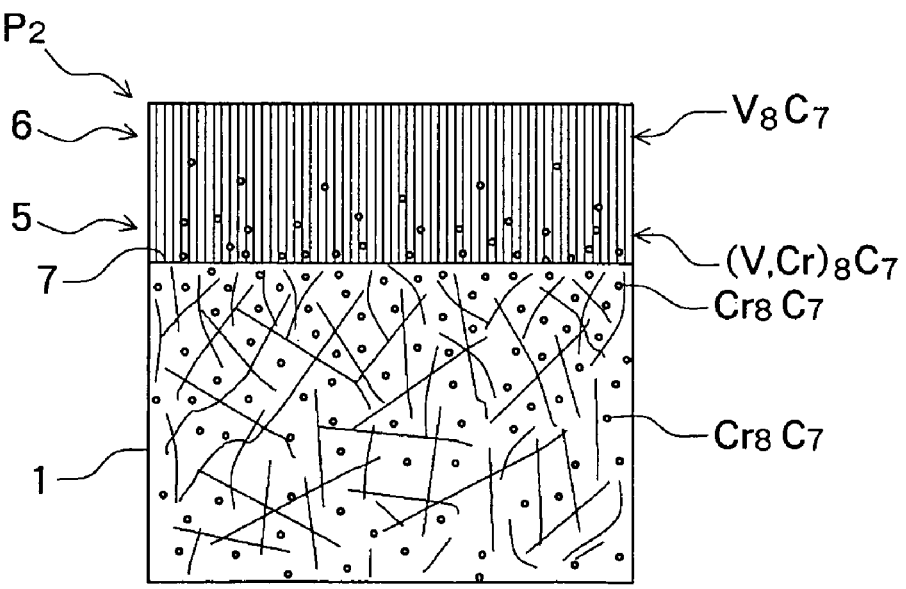

FIG. 4 shows the chain pin $P_2$ manufactured by the inventive manufacturing method. The vanadium and chrome compound carbide [(V, Cr) $_8C_7$] is formed in the boundary part 5 facing to the pin base material 1 as described above. Further, the surface layer 6 composed of the vanadium carbide ($V_8C_7$) is coated on the boundary part 5 composed of the compound carbide. The compound carbide [(V, Cr) $_8C_7$] diffuses also to the pin base material 1 because V penetrates therein and exists together with chrome carbide ($Cr_8C_7$) therein. Although it exists most in the interface 7 with the pin base material 1, its Cr content decreases gradually from the interface 7 with the base material to the surface layer 6 and is not clearly divided. Accordingly, although the compound carbide [(V, Cr) $_8C_7$] layer may be assumed to exist in the boundary part from an analytical result of an X-ray probe micro-analyzer described later as shown in FIG. 4b, it is unable to recognize an interface 8 between the surface layer 6 and the compound carbide layer 5 and only the interface 7 between the pin base material 1 and the surface layer 6 is recognizable from a sectional photograph as shown in FIGS. 4a and 4c. Accordingly, it is unable to clearly divide the compound carbide layer 5.

Figure 5A:
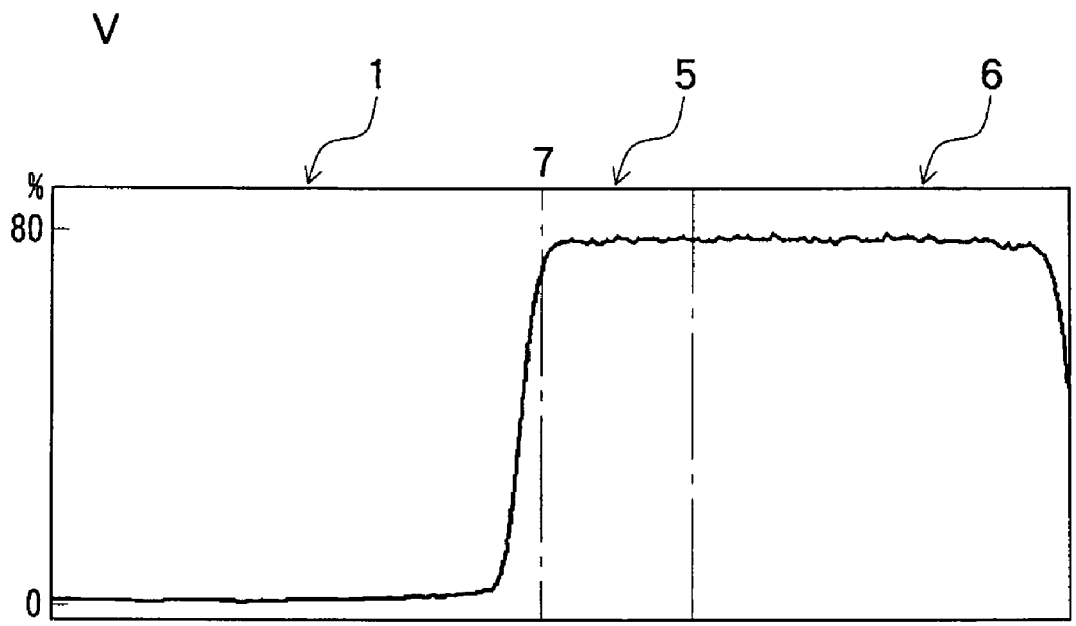
Figure 5B:
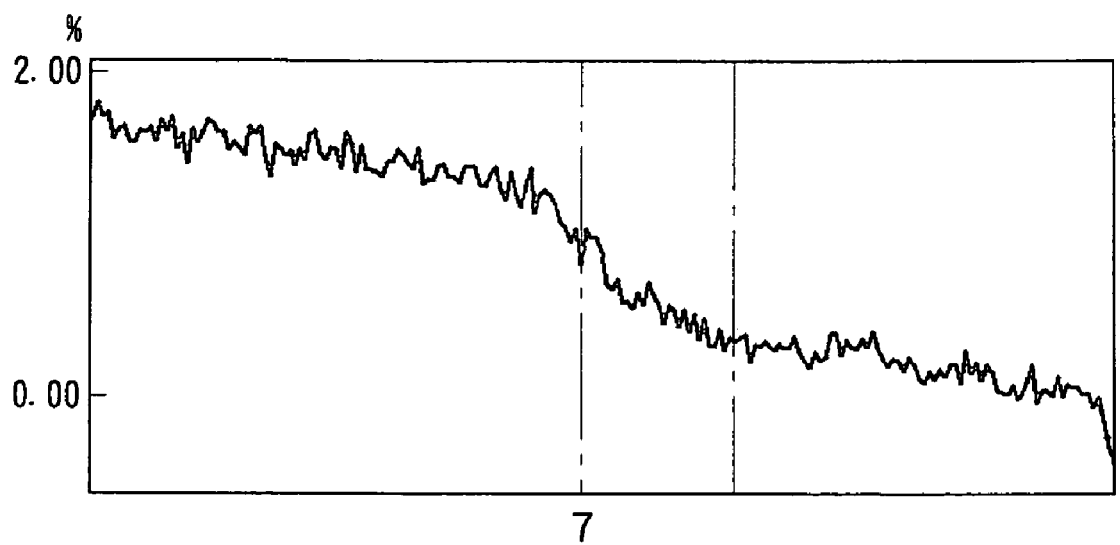

FIGS. 5a and 5b show the results obtained by analyzing, through the use of the X-ray probe micro-analyzer, the inventive chain pin for which SUJ2 has been used as its base material and on which the above-mentioned vanadium cementation process has been carried out. FIG. 5a shows the vanadium content. While the vanadium content is about 80% at a predetermined distance (about 20 µm) from the surface of the pin, it drops sharply at the boundary part 7 and is about 0% in the pin base material.

FIG. 5b shows the chrome content analyzed by the above-mentioned analyzer with a large current by using kβ1 primary ray. It is understood from the analysis that the chrome content drops gradually from the base material to the surface of the pin. That is, chrome (Cr) diffuses and penetrates into the vanadium carbide layer (surface layer) from the chrome-rich pin base material by the heat treatment at high temperature, thus forming the compound carbide layer [(V, Cr) $_8C_7$] 5. The chrome content within the compound carbide layer is highest at the interface 7 and decreases gradually toward the surface of the pin. The content is about 0 [%] at a predetermined distance (about 6 µm) from the interface. The part from there to the surface of the pin is the surface layer 6 mostly composed of the vanadium carbide.

Generally, the heat treatment temperature has been set at 1,000° C. or less in the vanadium cementation process in order to avoid the grain of the vanadium carbide from being roughened and the temperature has been set at 900° C. to 1,000° C. also in the conventional vanadium cementation process shown in FIG. 1. Even if carbide forming elements, e.g., Cr, exists in the pin base material, its content as well as diffusion effective amount are small in the conventional method. Therefore, it is difficult to obtain the composition gradient intermediate layer like the compound carbide layer [(V, Cr)xCy]5 described above. Even if it may be possible to obtain the diffusion effect of the carbide forming element such as Cr contained in the base material by increasing the heat treatment temperature to 1,000° C. or more, it is unable to obtain the diffusion effect described above because the amount of the carbide forming element (Cr) in the base material is small as described above.

However, the invention enables one to obtain the composition gradient intermediate layer composed of the above-mentioned compound carbide by diffusing Cr in the base material to the vanadium carbide layer by setting the temperature of the vanadium cementation process at 1,000° C. or more because the Cr content in the base material is high. It is noted that the temperature of the cementation process is desirable to be in a range from 1,000° C. to 1,100° C. because the vanadium carbide (VC) grain is roughened, possibly causing a fall-out phenomenon of the VC grains, if the temperature of the heat treatment exceeds 1,100° C.

While the chain pin P2 has the surface treated coating film, i.e., the coating film in which the surface layer 6 composed of $V_8C_7$ is combined with the boundary part 5 composed of (V, Cr) $_8C_7$, of 10 µm to 30 µm, it is preferable to be around 20 µm (16 to 25 µm). Then, a predetermined quenching, tempering or isothermal transformation process is carried out after the cementation process described above in order to enhance the pin.

Although the conventional manufacturing method of the pin $P_1$ described above has required two steps of heat treatments as shown in FIG. 1 and has been cumbersome that much, the inventive manufacturing method of the pin P2 requires only one step of heat treatment as shown in FIG. 3. Accordingly, the high precision pin P2 may be manufactured readily, effectively and accurately.

Further, although the chrome carbide ($Cr_8C_7$) in the intermediate layer adheres the surface layer 3 mainly composed of vanadium carbide ($V_8C_7$) to the base material (Fe) at high adhesion strength in the conventional chain pin $P_1$, the distinguishable interfaces 2a and 2b exist between the chrome carbide layer 2 and the surface layer 3 and the adhesion strength is not enough because the chrome carbide layer (intermediate layer) 2 is composed of clearly distinguishable independent layer as shown in FIG. 2.

However, in the inventive chain pin $P_2$, the compound carbide [(V, Cr) $_8C_7$] is formed by Cr and C supplied from the chrome-rich base material 1 together with V in the atmosphere, the compound carbide layer 5 is undistinguishable in the boundary part between the surface layer 6 composed of vanadium carbide ($V_8C_7$) and the pin base material 1 and the Cr content changes gradually as shown in FIGS. 4a, 4b and 4c, so that the compound carbide 5 adheres the surface layer 6 composed of vanadium carbide ($V_8C_7$) to the pin base material 1 with high adhesion strength. Further, the surface layer 6 composed of vanadium carbide has high face pressure resistance and prevents peeling from occurring at the surface even in a severe use condition in which high face pressure acts under a high-temperature environment.

Figure 6:
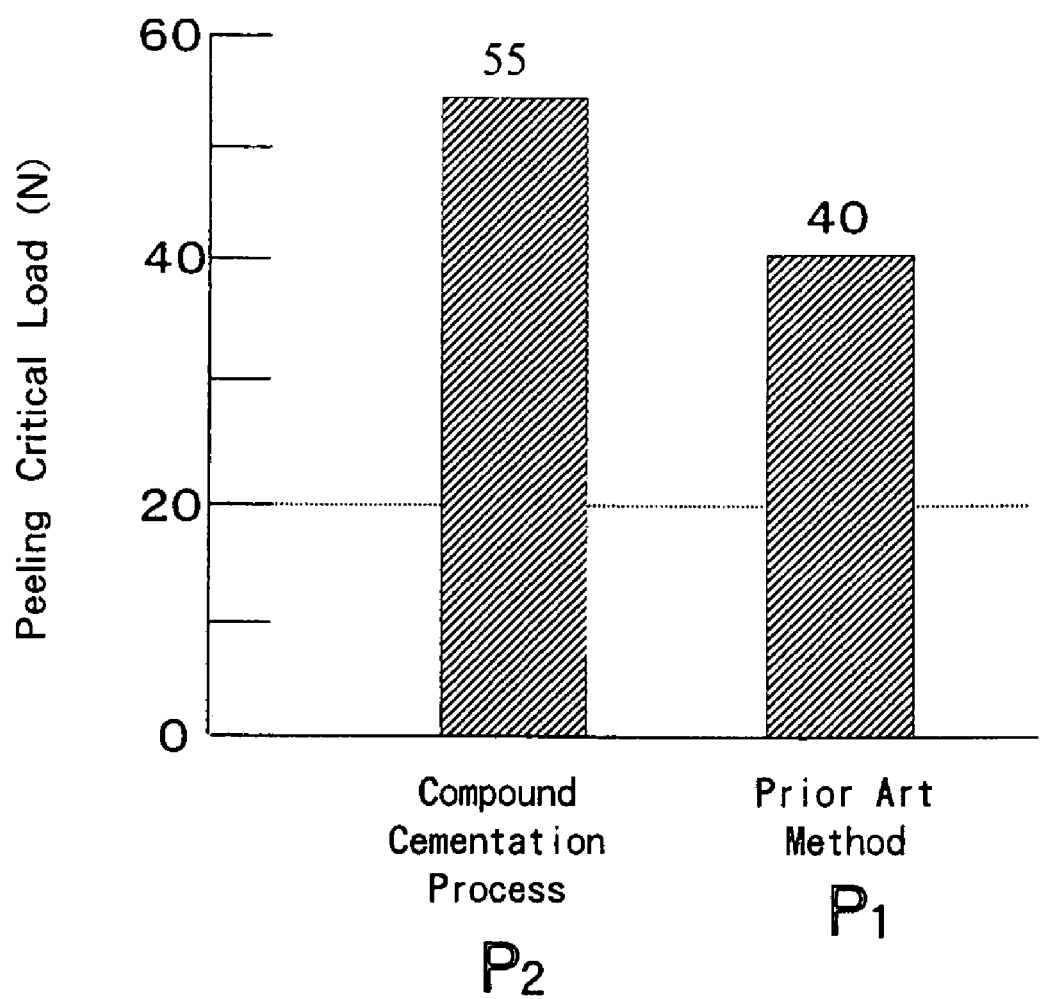
FIG. 6 is a graph showing the results of scratch test.

FIG. 6 shows results of scratch test carried out to find peeling critical load by scratching the pins while pressing a diamond indenter thereto and increasing the load continuously. The test results show that the pin $P_2$ manufactured through the inventive compound cementation process has high peeling critical load as compared to the conventional pin $P_1$. That is, it is understood that vanadium carbide, i.e., the surface layer, of the inventive pin $P_2$ is adhering strongly as compared to the conventional pin $P_1$.

The inventive chain pin described above is applicable to all kinds of power transmission chains such as publicly known roller chains and silent chains and is suitably applicable to a timing chain or the like used in a severe use environment such as an engine.

The invention claimed is:

1. A chain pin, comprising:
   a pin base material containing 0.6[%] or more chrome,
   a surface layer composed of vanadium carbide; and
   a boundary part provided between said pin base material and said ace layer and composed of compound carbide of vanadium and chrome,
   wherein a content of chromium carbide in said boundary part gradually decreases such that it is maximized at a boundary face with said pin base material and becomes zero [%] at said surface layer.

2. The chain pin as set forth in claim 1, wherein said chain pin is a pin for use in a silent chain.

3. The chain pin as set forth in claim 1, wherein said chain pin is a pin for use in a roller chain.

* * * * *